United States Patent
Gruenewaelder et al.

(10) Patent No.: US 7,253,244 B2
(45) Date of Patent: Aug. 7, 2007

(54) FAST SETTING 1K-POLYURETHANE GLUE

(75) Inventors: Bernhard Gruenewaelder, Hilden (DE); Werner Haller, Erkrath (DE); Bernhard Schoettmer, Monheim (DE); Thomas Empt, Viersen (DE); Hermann Kluth, Duesseldorf (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 226 days.

(21) Appl. No.: 10/798,162

(22) Filed: Mar. 11, 2004

(65) Prior Publication Data

US 2005/0032972 A1    Feb. 10, 2005

Related U.S. Application Data

(63) Continuation of application No. PCT/EP02/09049, filed on Aug. 13, 2002.

(30) Foreign Application Priority Data

Aug. 16, 2001  (DE) ................. 101 40 102

(51) Int. Cl.
    *C08G 18/00* (2006.01)
    *C08G 18/08* (2006.01)
    *C08J 3/00* (2006.01)
    *C08K 3/20* (2006.01)
    *C08L 75/00* (2006.01)

(52) U.S. Cl. .................. 528/48; 524/97; 524/589; 524/590; 528/44; 528/52; 528/53; 528/59; 528/60; 528/65; 528/66; 528/67; 528/76; 528/77; 528/78; 528/85

(58) Field of Classification Search ........ 524/589, 524/590, 97; 528/44, 48, 52, 53, 59, 60, 528/65, 66, 67, 76, 77, 78, 85
See application file for complete search history.

(56) References Cited

U.S. PATENT DOCUMENTS 4,426,487 A    1/1984  Konig et al.
5,270,433 A   12/1993  Klauck et al.

FOREIGN PATENT DOCUMENTS

| CA | 2 238 412 | 5/1997 |
| DE | 38 40 220 A1 | 5/1990 |
| DE | 40 11 455 A1 | 10/1991 |
| DE | 196 46 879 A1 | 5/1997 |
| EP | 0 746 577 B1 | 8/1998 |
| WO | WO 97/19122 A1 | 5/1997 |
| WO | WO 00/44847 A1 | 8/2000 |

OTHER PUBLICATIONS

Gerd Habenicht, Kleben:Grundiagen, Technologie, Anwendungen:, 2nd Edition, pgl 65, (1990).
Kunststoff-Handbuch, vol. 7, Polyurethane, pp. 108, 1993.
Plastics-Resins in the liquid state or as emulsions or dispersions—Determination of apparent viscosity by the Brookfield Test Method, Europaische Norm European Standard Norme Europeenne, DIN EN ISO 2555, pp. 1-9 (Jan. 2000).
Adhesives—Determination of isocyanate content, Europaische Norm European Standard Norme Europeenne, DIN EN 1242, pp. 1-4 (Feb. 1998).
Evaluation of non-structural adhesives for joining wood and derived timber products, Europaische Norm European Standard Norme Europeenne, DIN EN 204, pp. 1-3 (Oct. 1991).
Test Method for wood adhesives for non-structural applications; determination of tensile shear strength of lap joints, Europaische Norm European Standard Norme Europeenne, pp. 1-5, DIN EN 205 (May 1991).

*Primary Examiner*—Patrick Niland
(74) *Attorney, Agent, or Firm*—Stephen D. Harper; Glenn E. J. Murphy

(57) ABSTRACT

A one-pack polyurethane adhesive containing a polyisocyanate prepolymer and at least one aminoether polyol, having a molar ratio of ether groups to amino nitrogen in the aminopolyether polyol of 7 to 30.

7 Claims, No Drawings

FAST SETTING 1K-POLYURETHANE GLUE

CROSS REFERENCE TO RELATED APPLICATIONS

This application is a continuation under 35 U.S.C. § 365(c) and 35 U.S.C. § 120 of international application PCT/EP02/09049, filed Aug. 13, 2002. This application also claims priority under 35 U.S.C. § 119 of DE 101 40 102.7, filed Aug. 16, 2001, which is incorporated herein by reference in its entirety.

BACKGROUND OF THE INVENTION

This invention relates to a fast, one-pack polyurethane adhesive at least containing a polyisocyanate prepolymer and at least one aminopolyol.

The fast, durable fixing of workpieces is a problem frequently encountered in the home, in the workshop and in industry. In cases where mechanical fixing is not possible or is undesirable, corresponding workpieces are very often bonded. An adhesive suitable for this purpose has to be meet a variety of requirements according to the constituent material of the workpieces to be bonded and the stresses to which the bonded workpieces are subjected by outside influences, for example by moisture.

Thus, several materials, for example paper or paperboard, can be permanently fixed particularly quickly with known cyanoacrylate adhesives. However, known cyanoacrylate adhesives have disadvantages which prevent them from being used in many areas of workpiece bonding. For example, the adhesion of cyanoacrylate adhesives to wood is unsatisfactory so that the strength level of a wood-to-wood bond involving cyanoacrylate adhesives is poor. In addition, cyanoacrylate adhesives cannot be used for bonds where there are one or more gaps in the adhesive joint because such adhesives do not have any gap-filling properties.

In addition, wood glues typically based on polyvinyl acetate dispersions are already known, particularly for wood-to-wood bonding. These known wood glues show good adhesion to many substrates, especially to wood. Unfortunately, the setting time of such glues, i.e. the time elapsing before a strong bond is developed, is very long so that continuous mechanical fixing of the workpieces to be bonded is generally essential. In addition, the use of such adhesives is often problematic when the bond is exposed to moisture because wood glues normally have only limited resistance to water.

Polyurethane adhesives (PUR adhesives) are also suitable for bonding wooden workpieces. Polyurethane adhesives are marketed as one-pack or two-pack adhesives. In many cases, the use of two-pack adhesives is difficult for the user because application of the adhesive itself is preceded by often problematic mixing of the two adhesive components. In addition, the setting times of known two-pack PUR adhesives are still too slow for the rapid fixing of workpieces.

One-pack PUR adhesives are also known (see, for example, Habenicht, Gerd: "Kleben: Grundlagen, Technologie, Anwendungen", 2nd Edition, 1990, pages 65 and 66). They normally contain aromatic polyisocyanates and polyols or NCO prepolymers produced therefrom and catalysts and other additives. In the presence of atmospheric moisture, they set in 10 to 60 minutes. The catalysts are usually tin compounds and/or tertiary amines used in concentrations of up to 1% by weight.

One-pack PUR adhesives containing aliphatic diisocyanates are also known. Trimerization products of aliphatic diisocyanates are used in such one-pack PUR adhesives because they contain only small amounts of volatile isocyanates and, hence, are toxicologically safer and do not have to be identified on labelling. Unfortunately, aliphatic isocyanates are attended by the disadvantage that they react far more slowly than aromatic isocyanates. Accordingly, they are unsuitable for many applications where particularly quick setting of the adhesive is crucial.

Although the setting rate of polyurethane adhesives can be accelerated by increasing the quantity of catalyst in the adhesive, this does lead to problems which affect the quality of the adhesive and hence its acceptance by the user. Relatively high concentrations of catalyst often lead to non-storable adhesives because secondary reactions are also accelerated by the increased amount of catalyst and cause the viscosity of the adhesive to increase excessively within a few months, so that the adhesive becomes unusable. In addition, the open time of the adhesive, i.e. the time available to the user for assembling, aligning and pressing the workpieces together after application of the adhesive, is reduced to an unacceptable level.

WO 97/19122 describes a one-pack polyurethane adhesive based on at least one polyisocyanate, at least one isocyanate-reactive oligomer compound and at least one catalyst which comprises at least one tertiary amine with at least one functional group for incorporation in the polymer chain. The incorporable tertiary amine may contain inter alia OH groups as functional groups, for example dimethylaminoethoxy ethanol. In addition, typical catalysts which are not incorporated, for example triethylamine, may also be used. The polyisocyanates may be both aliphatic and aromatic; preferably they are aromatic. The effects described in WO 97/19122 are in need of improvement. This applies in particular to the storage stability of prepolymers based on aromatic polyisocyanates, to setting times of under 5 minutes and to the tensile shear strengths where unusual applications are also to be covered.

Accordingly, there was a need for adhesives which would allow particularly quick fixing and bonding of workpieces, especially wooden workpieces; the bond would be both gap-filling and would have sufficient resistance to outside influences, such as moisture or direct contact with water. The acceleration of fixing would both relate to the open time and would also be absolute.

There was also a need for adhesives which would have the properties mentioned above and which, in addition, would have an adequate open time.

Accordingly, the problem addressed by the present invention was to provide such an adhesive.

The problem stated above is solved by a one-pack polyurethane adhesive as described in the following.

DESCRIPTION OF THE INVENTION

Accordingly, the present invention relates to a one-pack polyurethane adhesive at least containing a polyisocyanate prepolymer and at least one aminopolyether polyol, the molar ratio of ether groups to aminonitrogen in the aminopolyether polyol being 7 to 30:1.

A one-pack polyurethane adhesive according to the invention contains at least one polyisocyanate prepolymer. A "polyisocyanate prepolymer" in the present context is understood to be a compound which has a molecular weight of at least 300 and, more particularly, at least 500, which contains more than one isocyanate group, preferably at least ca. 1.5 or at least ca. 2 isocyanate groups and which can be obtained by reaction of a compound containing at least one isocyanate-reactive functional group with a polyisocyanate containing more than one isocyanate group or by oligomerization of polyisocyanates.

Accordingly, polyfunctional aromatic or aliphatic isocyanates or oligomerized products with NCO groups produced therefrom or mixtures of two or more thereof are used for the production of the polyisocyanate prepolymers present in the one-pack PUR adhesives according to the invention.

"Polyfunctional" in the present context means a functionality of more than 1.0, for example a functionality of ca. 1.5 or ca. 2 or ca. 2.5 to ca. 3.5, for example ca. 3, or a higher functionality of, for example, ca. 4 or ca. 5 or higher. The functionality does not necessarily have to be expressed by an integer; non-integer functionalities are also possible. Non-integer functionalities occur, for example, in mixtures of polyisocyanates of different functionality, the total functionality being determined via the total number of molecules present in the isocyanate mixture and the total number of isocyanate groups, based on the mixture as a whole.

Suitable polyfunctional isocyanates preferably contain on average 2 to at most about 5 and preferably up to about 4 NCO groups.

For example, diisocyanates $Q(NCO)_2$, where Q is an aliphatic, optionally substituted hydrocarbon radical containing 4 to about 12 carbon atoms, an optionally substituted cycloaliphatic hydrocarbon radical containing 6 to about 15 carbon atoms, an optionally substituted aromatic hydrocarbon radical containing 6 to about 15 carbon atoms or an optionally substituted araliphatic hydrocarbon radical containing 7 to about 15 carbon atoms, are used in accordance with the invention for the production of the polyisocyanate prepolymers. Examples of such diisocyanates are tetramethylene diisocyanate, hexamethylene diisocyanate (HDI), dodecamethylene diisocyanate, dimer fatty acid diisocyanate, 1,4-diisocyanatocyclohexane, 1-isocyanato-3,3,5-trimethyl-5-isocyanatomethyl cyclohexane (isophorone diisocyanate, IPDI), 4,4'-diisocyanato-dicyclohexylmethyl, 4,4'-diisocyanatodicyclohexyl-2,2-propane, 2,4- or 2,6-diisocyanatotoluene (2,4- or 2,6-TDI) or a mixture thereof, 2,2'-, 2,4'- or 4,4'-diisocyanatodiphenylmethane (MDI), tetramethylene xylylene diisocyanate (TMXDI), p-xylylene diisocyanate and mixtures of these compounds. In addition, polymeric polyisocyanates, such as oligomer or polymer-MDI and isomers and homologs thereof, more particularly mixtures of 2,2'-, 2,4'- and 4,4'-diisocyanatodiphenylmethane (MDI), or the polyisocyanates obtainable by phosgenation of technical polyamine mixtures from the condensation of aniline and formaldehyde are also particularly suitable. Such mixtures have a functionality of, for example, ca. 2.0 to ca. 5.0 and, more particularly, ca. 2.5 to ca. 4.5.

The polyisocyanates of higher functionality known per se in polyurethane chemistry or modified polyisocyanates known per se, for example polyisocyanates containing carbodiimide groups, allophanate groups, isocyanurate groups, urethane groups or biuret groups, may of course also be used.

Examples of suitable isocyanates are phenyl isocyanate, 1,5-naphthylene diisocyanate, hydrogenated MDI ($H_{12}$MDI), 4,4'-diphenyl dimethyl methane diisocyanate, di- and tetraalkyl diphenyl methane diisocyanate, 4,4'-dibenzyl diisocyanate, 1,3-phenylene diisocyanate, 1,4-phenylene diisocyanate, the isomers of toluene diisocyanate (TDI), optionally in admixture, 1-methyl-2,4-diisocyanatocyclohexane, 1,6-diisocyanato-2,2,4-trimethyl hexane, 1,6-diisocyanato-2,4,4-trimethyl hexane, chlorinated and brominated diisocyanates, phosphorus-containing diisocyanates, 4,4'-diisocyanatophenyl perfluoroethane, tetra-methoxybutane-1,4-diisocyanate, dicyclohexyl methane diisocyanate, cyclohexane-1,4-diisocyanate, ethylene diisocyanate, phthalic acid bis-isocyanatoethyl ester; polyisocyanates containing reactive halogen atoms, such as 1-chloromethylphenyl-2,4-diisocyanate, 1-bromomethylphenyl-2,6-diisocyanate, 3,3-bis-chloromethylether-4,4'-diphenyl diisocyanate. Sulfur-containing polyisocyanates are obtained, for example, by reacting 2 mol hexamethylene diisocyanate with 1 mol thiodiglycol or dihydroxydihexyl sulfide. Other important diisocyanates are trimethyl hexamethylene diisocyanate, 1,4-diisocyanatobutane, 1,12-diisocyanatododecane and dimer fatty acid diisocyanate. Also suitable are partly masked polyisocyanates which enable self-crosslinking polyurethanes to be formed, for example dimeric toluene diisocyanate, or polyisocyanates partly or completely reacted, for example, with phenols, tertiary butanol, phthalimide, caprolactam.

In one particular embodiment, the isocyanate component for the production of the one-pack PUR adhesives according to the invention partly contains dimer fatty acid isocyanate. Dimer fatty acid is a mixture of predominantly $C_{36}$ dicarboxylic acids which is obtained by thermal or catalytic dimerization of unsaturated $C_{18}$ monocarboxylic acids, such as oleic acid, tall oil fatty acid or linoleic acid. Dimer fatty acids have long been known to the expert and are commercially available. The dimer fatty acid can be reacted to form dimer fatty acid isocyanates. Technical dimer fatty acid diisocyanate contains on average at least two and less than three isocyanate groups per molecule of dimer fatty acid.

Diisocyanates trimerized to isocyanurates, for example the isocyanurate of HDI and IPDI, are also suitable for the production of one-pack PUR adhesives of low isocyanate content or the polyisocyanate prepolymers present in such adhesives. The trimerization reaction takes place in the presence of suitable trimerization catalysts (see, for example, Kunststoff-Handbuch, Vol. 7, Polyurethanes, page 108). Mixtures of cyclotrimers of aliphatic and cycloaliphatic diisocyanates, more especially mixed trimers, are particularly advantageous.

The higher homologs of MDI containing three or more isocyanate groups per molecule (=polymer MDI) which are obtainable, for example, by removal of the difunctional isocyanate by distillation from technical MDI (=crude MDI) are also suitable for the same purpose. The same applies to so-called tri-MDI, the trifunctional homolog of MDI.

Higher homologs of MDI (polymer MDI) or aliphatic polyisocyanates, more especially trimerized diisocyanates and, above all, trimerized HDI, may also be used as quantitatively the principal component of the polyisocyanates.

It can be appropriate to use oligomerized NCO adducts of the above-mentioned isocyanates and polyols, polyamines or aminoalcohols, more especially adducts of aromatic isocyanates.

The polyisocyanate prepolymers present in the one-pack PUR adhesives according to the invention are produced by reaction of polyisocyanates with compounds containing more than one isocyanate-reactive functional group. These compounds are polyols, i.e. compounds containing more than one OH group, for example ca. 1.1, ca. 1.3, ca. 1.5, ca. 1.8 to ca, 2.8, more particularly ca. 1.9 to ca. 2.2, more particularly ca. 2.0 or more than ca. 2.8, for example ca. 3, ca. 4 or more OH groups.

Basically, suitable compounds containing more than one isocyanate-reactive functional group are, for example, OH-functional polyesters, polyethers, polyacetals, polycarbonates, polyacrylates, polymethacrylates, polyvinyl polymers or mixtures of two or more thereof. In the interests of simplicity, such compounds are referred to hereinafter as polymer polyols. Accordingly, compounds suitable for the production of polymer polyols are described in the following text. In the interests of clarity, the compounds are represented as compounds containing OH groups, unless otherwise stated. However, corresponding compounds which contain another NCO-reactive functional group, for example an amino group or a carboxyl group, instead of the OH group mentioned in the following text—if such a compound exists or can be produced—may equally well be used in accordance with the invention.

Polyesters suitable for the formation of polymer polyols are, for example, predominantly linear polymers containing terminal OH groups (polyester polyols), preferably those containing two or three, more particularly two, terminal OH groups. The acid value of such polyester polyols is generally below about 10 and preferably below about 3. Polyesters with a molecular weight of ca. 1,000 to ca. 50,000, for example ca. 2,000 to ca. 15,000 or ca. 2,500 to ca. 5,000, are suitable for use as polymer polyols in accordance with the invention. For example, polyesters obtained by reaction of low molecular weight alcohols, more particularly linear or branched, saturated or unsaturated, aliphatic or aromatic glycols, may be used. Examples of such alcohols are diethylene glycol, ethane-1,2-diol, propane-1,3-diol, 2-methylpropane-1,3-diol, butane-1,4-diol, pentane-1,5-diol, hexane-1,6-diol, heptane-1,7-diol, octane-1,8-diol, nonane-1,9-diol, decane-1,10-diol and the corresponding higher homologs obtained by step-by-step extension of the carbon chain of the compounds mentioned and, for example, 2,2,4-trimethylpentane-1,5-diol, 2,2-dimethylpropane-1,3-diol, 1,4-dimethylol cyclohexane, 1,4-diethanol cyclohexane, 2-methyl-2-butylpropane-1,3-diol, 2,2-dimethylbutane-1,4-diol, 1,4-dimethylol cyclohexane, hydroxypivalic acid neopentyl glycol ester, diethylene glycol, triethylene glycol, methyl diethanolamine or aromatic-aliphatic or aromatic-cycloaliphatic diols containing 8 to ca. 30 carbon atoms, heterocyclic ring systems or preferably isocyclic ring systems, such as naphthalene or, more particularly, benzene derivatives, such as bisphenol A, being usable as aromatic structures, 2× symmetrically ethoxylated bisphenol A, 2× symmetrically propoxylated bisphenol A, more highly ethoxylated or propoxylated bisphenol A derivatives or bisphenol F derivatives, the hydrogenation products of the bisphenol A and bisphenol F derivatives mentioned or the products of the corresponding reaction of a compound or a mixture of two or more of the compounds mentioned with an alkylene oxide containing 2 to about 8 carbon atoms or a mixture of two or more such alkylene oxides.

Suitable polyester polyols can be obtained, for example, by polycondensation. Thus, dihydric or trihydric alcohols or a mixture of two or more thereof may be condensed with dicarboxylic acids or tricarboxylic acids or a mixture of two or more thereof or reactive derivatives thereof to form polyester polyols. Suitable dicarboxylic acids are, for example, succinic acid and higher homologs thereof containing up to 44 carbon atoms, unsaturated dicarboxylic acids, such as maleic acid or fumaric acid, and aromatic dicarboxylic acids, particularly the isomeric phthalic acids, such as phthalic acid, isophthalic acid or terephthalic acid. Suitable tricarboxylic acids are, for example, citric acid or trimellitic acid. Polyester polyols of at least one of the dicarboxylic acids mentioned and glycerol which have a residual OH group content are particularly suitable for the purposes of the invention. Particularly suitable alcohols are hexanediol, ethylene glycol, diethylene glycol or neopentyl glycol or mixtures of two or more thereof. Particularly suitable acids are phthalic acid, isophthalic acid, terephthalic acid or adipic acid and mixtures thereof.

Other polyols suitable as polyol component for the production of the polyesters are, for example, diethylene glycol or higher polyethylene glycols with a molecular weight ($M_n$) of ca. 100 to ca. 22,000 for example ca. 200 to ca. 15,000 or ca. 300 to ca. 10,000, more particularly ca. 500 to ca. 2,000.

Polyesters suitable as polymer polyols for the purposes of the invention include, in particular, the reaction products of polyhydric, preferably dihydric alcohols (optionally together with small quantities of trihydric alcohols) and polybasic, preferably dibasic, carboxylic acids. Instead of free polycarboxylic acids, the corresponding polycarboxylic anhydrides or corresponding polycarboxylic acid esters with alcohols preferably containing 1 to 8 carbon atoms may also be used (where they exist). The polycarboxylic acids may be aliphatic, cycloaliphatic, aromatic and/or heterocyclic. They may optionally be substituted, for example by alkyl groups, alkenyl groups, ether groups or halogens. Suitable polycarboxylic acids are, for example, succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, tetrachlorophthalic anhydride, tetrabromophthalic anhydride, endomethylene tetrahydrophthalic anhydride, glutaric anhydride, maleic acid, maleic anhydride, fumaric acid, dimer fatty acid or trimer fatty acid or mixtures of two or more thereof. Small quantities of monofunctional fatty acids may optionally be present in the reaction mixture.

Corresponding polyesters may contain terminal carboxyl groups for example. Polyesters obtainable from lactones, for example $\epsilon$-caprolactone, or hydroxycarboxylic acids, for example $\omega$-hydroxycaproic acid, may also be at least partly used.

To produce the polyester polyols, it may be of advantage to use corresponding acid derivatives, such as carboxylic anhydrides or carboxylic acid chlorides, where they are available, instead of the dicarboxylic acids themselves.

In a preferred embodiment of the invention, ethane-1,2-diol, propane-1,3-diol, 2-methylpropane-1,3-diol, butane-1,4-diol, hexane-1,6-diol, 2,2-dimethylpropane-1,3-diol, 1,4-dimethylolcyclohexane, 1,4-diethanolcyclohexane, and ethoxylated or propoxylated products of 2,2-bis-(4-hydroxyphenylene)-propane (bisphenol A) are used for the production of the polyester polyols. Depending on the required properties of the polyisocyanate prepolymers provided with the corresponding polymer polyols, the polyester polyols mentioned may be used on their own or in the form of a mixture of two or more of the polyester polyols mentioned in various quantity ratios for the production of the polyisocyanate prepolymers. Suitable lactones for the production of the polyester polyols are, for example, dimethylpropiolactone, $\gamma$-butyrolactone or $\epsilon$-caprolactone.

Polyether polyols are also suitable for use as polymer polyols in the production of the above-mentioned one-pack PUR adhesives. Polyether polyols are understood to be substantially linear compounds with ether bonds which contain terminal OH groups as defined in the foregoing text. Suitable polyether polyols may be produced, for example, by polymerization of cyclic ethers, such as ethylene oxide, propylene oxide, butylene oxide or tetrahydorfuran or by reaction of a mixture of two or more alkylene oxides containing 2 to 12 carbon atoms in the alkylene group with a starter molecule containing two active hydrogen atoms.

Suitable alkylene oxides are, in particular, ethylene oxide, 1,2-propylene oxide, epichlorohydrin, 1,2-butylene oxide or 2,3-butylene oxide or mixtures of two or more thereof.

The polymerization is generally carried out in the presence of a base as catalyst. The polyethers used in accordance with the invention are, for example, polyalkylene glycols obtainable by polymerization of ethylene oxide or propylene oxide, optionally in admixture with $C_{4-12}$ alkylene oxides. Suitable polyether polyols are, for example, polyethylene glycols containing $C_3$ or $C_4$ units, or both, which can be obtained by copolymerization of ethylene oxide with propylene oxide or butylene oxide or a mixture thereof.

Polyethers obtainable by Co—Zn cyanide complex catalysis are also suitable.

In a preferred embodiment of the invention, polyalkylene glycols obtained by addition of PO or EO or mixtures thereof onto diols or triols containing primary, secondary or tertiary OH groups or mixtures of two or more such diols or triols as starter molecules are used as the polyether polyols.

Basically, suitable starter molecules are water or any mono- or polyfunctional low molecular weight alcohols or mixtures thereof, although polyalkylene glycols produced using a dihydric or trihydric alcohols, for example ethylene glycol, propylene glycol, butylene glycol, pentanediol, hexanediol, heptanediol, octanediol and higher homologs thereof, neopentyl glycol, glycerol, trimethylol propane, triethylol propane, pentaerythritol, glucose, sorbitol, mannitol or a mixture of two or more thereof as starter molecule, are preferably used in accordance with the invention.

The polyalkylene glycols may be used individually, i.e. as a polyaddition product with the molecular weight distributions typically formed in base-catalyzed additions of alkylene oxides onto water or other starter molecules. However, mixtures of different polyalkylene glycols with different molecular weight distributions may also be used for the production of the polyisocyanate prepolymers. Polyalkylene glycols formed by addition of only one alkylene oxide compound onto a starter molecule may also be used. However, polyalkylene glycols obtainable by addition of various alkylene oxides are also suitable. They may be both block copolymers and statistical copolymers.

Polymer polyols containing ether and ester groups which may be obtained by polycondensation of polycarboxylic acids with polyethers are also suitable as polymer polyols for the purposes of the invention. Basically, the above-mentioned polycarboxylic acids and polyethers are suitable for this purpose.

Polymer polyols containing ether and ester groups which may be obtained by ring opening of epoxidized oils, for example epoxidized soybean oil, with mono- or polyalcohols are also suitable as polymer polyols for the purposes of the invention.

Other suitable polyether polyols are OH-terminated polyamides which can be obtained by polycondensation of polycarboxylic acids with polyamines, more particularly by reaction of dicarboxylic acids with diamines, and which can be provided with terminal OH groups. Suitable dicarboxylic acids are, for example, the already mentioned dicarboxylic acids suitable for the production of polyesters, more particularly dimer fatty acids.

In a preferred embodiment of the present invention, polyether polyols are used as the polymer polyols. Particularly preferred polyether polyols have a molecular weight of at least ca. 500, but preferably at least ca. 1,000, for example ca. 1,500 to ca. 10,000 or ca. 2,000 to ca. 5,000. Basically, the above-described polyether polyols of $C_{2-8}$ alkylene oxides are suitable for the purposes of the present invention although polyether polyols of $C_{3-5}$ alkylene oxides, especially propylene oxide, are preferably used. Polyether polyols of the Lupranol series marketed by BASF, for example Lupranol 1000, or Voranol P 2000 of Dow Chemicals are particularly suitable for the purposes of the invention.

Polycarbonates, for example, may also be used as polymer polyols in accordance with the invention. The polycarbonates used are, for example, substantially linear and contain at least two, preferably terminal, OH groups. Corresponding polycarbonate polyols are produced, for example, by reaction of one of the above-mentioned dihydric alcohols or a mixture of two or more such dihydric alcohols with phosgene.

Aliphatic alcohols, for example, containing three or more functional groups and 3 to ca. 15 and preferably ca. 3 to ca. 10 carbon atoms may also be used in the production of the polymer polyols in quantities of up to ca. 10 or ca. 5% by weight, based on the total weight of the polymer polyols present in the polyisocyanate prepolymers. Suitable such compounds are, for example, trimethylol propane, triethylol propane, glycerol, pentaerythritol, sorbitol, mannitol and other sugar alcohols containing up to ca. 10 OH groups per molecule. The corresponding derivatives of the compounds mentioned, which can be obtained by reaction with an alkylene oxide containing 2 to ca. 4 carbon atoms or a mixture of two or more such alkylene oxides, may also be used for the production of the polymer polyols. The compounds mentioned may be used individually or in the form of mixtures of two or more of the compounds mentioned.

Compounds from the above-mentioned classes suitable for use as polymer polyols may already be present in a molecular weight range suitable for use as a polymer polyol. However, compounds from the above-mentioned classes with a molecular weight below the molecular weight suitable for use as a polymer polyol or below the molecular weight required for the purposes of the invention may equally well be used for the production of polymer polyols. In this case, it is possible in accordance with the invention to extend such compounds from the above-mentioned classes by reaction with corresponding difunctional compounds until they acquire the necessary or desired molecular weight. Dicarboxylic acids, difunctional epoxy compounds or diisocyanates, for example, are suitable for this purpose, diisocyanates being used in a preferred embodiment of the present invention.

Comparatively low molecular weight diols may optionally be present during such a chain extension. Examples include diethylene glycol, ethane-1,2-diol, propane-1,3-diol, 2-methylpropane-1,3-diol, butane-1,4-diol, pentane-1,5-diol, hexane-1,6-diol, heptane-1,7-diol, octane-1,8-diol, nonane-1,9-diol, decane-1,10-diol and the corresponding higher homologs obtained by step-by-step extension of the carbon chain of the compounds mentioned and, for example, 2,2,4-trimethylpentane-1,5-diol, 2,2-dimethylpropane-1,3-diol, 1,4-dimethylol cyclohexane, 1,4-diethanol cyclohexane, 2-methyl-2-butylpropane-1,3-diol, 2,2-dimethylbutane-1,4-diol, 1,4-dimethylol cyclohexane, hydroxypivalic acid neopentyl glycol ester, diethylene glycol, triethylene glycol, methyl diethanolamine or aromatic-aliphatic or aromatic-cycloaliphatic diols containing 8 to ca. 30 carbon atoms, heterocyclic ring systems or preferably isocyclic ring systems, such as naphthalene or, more particularly, benzene derivatives, such as bisphenol A, being usable as aromatic structures.

Low molecular weight amino compounds may optionally be present during such a chain extension. Suitable low molecular weight amino compounds are, for example, primary amino compounds containing 2 to ca. 20, for example 2 to ca. 12 carbon atoms, such as ethylamine, n-propylamine, i-propylamine, n-propylamine, sec. propylamine, tert. butyl amine, 1-aminoisobutane, substituted amines containing 2 to ca. 20 carbon atoms, such as 2-(N,N-dimethylamino)-1-aminoethane, aminomercaptans, such as 1-amino-2-mercaptoethane, aliphatic aminoalcohols containing 2 to ca. 20, preferably 2 to ca. 12 carbon atoms, for example monoethanolamine, 1-amino-3,3-dimethylpentan-5-ol, 2-aminohexane-2',2''-diethanolamine, 1-amino-2,5-dimethylcyclohexan-4-ol, 2-amino-propanol, 2-aminobutanol, 3-aminopropanol, 1-amino-2-propanol, 2-amino-2-methyl-1-propanol, 5-aminopentanol, 3-aminomethyl-3,5,5-trimethyl-cyclohexanol, 1-amino-1-cyclopentane methanol, 2-amino-2-ethylpropane-1,3-diol, aromatic-aliphatic or aromatic-cycloaliphatic aminoalcohols containing 6 to ca. 20 carbon atoms, heterocyclic ring systems or preferably isocyclic ring systems, such as naphthalene or, more particularly, benzene derivatives, such as 2-aminobenzyl alcohol, 3-(hydroxymethyl)-aniline, 2-amino-3-phenyl-1-propanol, 2-amino-1-phenylethanol, 2-phenyl glycinol or 2-amino-1-phenylpropane-1,3-diol or mixtures of two or more such compounds, being usable as aromatic structures.

The polymer polyols are produced to the normal rules of organic polymer chemistry. If a polyester, a polyether, a polycarbonate, a polyacetal or any other compound usable as a polymer polyol is used as the polymer polyol, it is produced by standard methods of polymer chemistry known to the expert. If various of the above-mentioned compounds suitable as polymer polyols are to be linked together because of the inadequate molecular weight of the individual compounds, this is also done to the normal rules of organic chemistry for the particular functional groups, depending on the difunctional compound used for the chain extension.

Instead of or together with the above-mentioned alcohols, polyfunctional primary or secondary amines may also be used as chain constituents. The same also applies to aminocarboxylic acids and low molecular weight protein compounds. Specific examples are polyoxyethylene, polyoxypropylene and polyoxybutylene diamine—both the homopolymers and copolymers based on these monomers—with molecular weights of up to 5,000 (Jeffamine) and glycine, alanine, valine, leucine, cysteine, cystine, aspartic acid, glutamic acid, tyrosine, tryptophane, $\epsilon$-aminocaproic acid, 11-aminoundecanoic acid, 4-aminobutyric acid, mono- and diaminonaphthoic acid. The percentage content of these substances should be less than 20 mol-% and preferably less than about 10 mol-%, based on the polyols used for the production of the polyisocyanate prepolymer.

In order to limit the functionality of the polyisocyanate prepolymers, up to 30% of the NCO groups can react with monofunctional compounds, more particularly with monoalcohols, monoamines and monocarboxylic acids. A corresponding method of limiting functionality is described, for example, in EP 0 746 577.

A polyisocyanate prepolymer used as a constituent of a one-pack PUR adhesive according to the invention may also be produced using a tertiary amine containing at least one functional group for incorporation in the polymer chain, one such amine being incorporated in the polymer chain. However, this amine does not contain any polyether structures. The number of functional groups in such a tertiary amine is preferably 2. However, 3 or 1 functional group(s) per tertiary amine are also possible.

Suitable tertiary amines contain, for example, —OH, —SH, —COOH, —NCO, —NH$_2$ and —NHR, where R is an alkyl group containing 1 to 25 carbon atoms, or a mixture of two or more thereof as functional groups. Hydroxyfunctional amines are preferably used. Suitable compounds are, for example, N,N-dimethyl ethanolamine, N,N-dimethyl diaminoethane, N-methyl diethanolamine, N,N-dimethyl-2-(2-dimethylaminoethoxy)-ethanol, N,N,N-trimethyl-N-hydroxyethyl diaminoethane bis-aminoethyl ether, N,N-bis-(3-dimethylaminopropyl)-N-isopropanolamine, tetramethylimino-bis-propylamine and N-(3-dimethylaminopropyl)-N,N-diisopropanolamine or mixtures of two or more thereof.

In the production of the polyisocyanate prepolymers present in the one-pack PUR adhesive according to the invention, suitable tertiary amines may be used in a quantity of 0 to 10, for example 0.1 to 5 or ca. 0.5 to ca. 3 g per 100 g prepolymer.

A polyisocyanate prepolymer suitable for use in an adhesive according to the invention has a molecular weight of at least ca. 500, but preferably of at least ca. 1,000. Polyisocyanate prepolymers with a molecular weight of at least ca. 2,000 are particularly suitable. The upper molecular weight limit is largely determined solely by the consistency of the adhesive which should be at least spreadable, preferably paste-like or, more particularly, liquid. This can optionally be achieved through the use of plasticizers or solvents although, in a preferred embodiment of the present invention, the adhesives according to the invention do not contain any solvents.

Accordingly, in a preferred embodiment of the invention, a polyisocyanate prepolymer suitable for use in an adhesive according to the invention has a Brookfield viscosity of ca. 500 to ca. 100,000 mPas, for example in the range from ca. 1,000 to ca. 20,000 mPas or in the range from ca. 2,000 to ca. 10,000 mPas (as measured to EN ISO 2555 using a Brookfield RVTDV-II Digital Viscometer, spindle 2, 20 r.p.m.).

Besides at least one polyisocyanate prepolymer, a one-pack polyurethane adhesive according to the invention preferably contains at least one non-incorporable catalyst. Suitable catalysts are, for example, tertiary amines which are not incorporated in the prepolymer chain, such as diazabicyclooctane (Dabco), triethylamine, dimethyl benzylamine (Desmorapid DB, BAYER AG), bis-dimethylaminoethyl ether (Catalyst A I, UCC), tetramethyl guanidine, bis-dimethylaminomethyl phenol, 2,2'-dimorpholinodiethyl ether, 2-(2-dimethylaminoethoxy)-ethanol, 2-dimethylaminoethyl-3-dimethylaminopropyl ether, bis-(2-diaminoethyl)-ether, N,N-dimethyl piperazine, N-(2-hydroxyethoxyethyl)-2-azanorbornane, Tacat DP-914 (Texaco Chemical), Jeffcat®, N,N,N,N-tetramethyl butane-1,3-diamine, N,N,N,N-tetramethyl propane-1,3-diamine or N,N,N,N-tetramethyl hexane-1,6-diamine or mixtures of two or more thereof.

The catalysts may also be present in oligomerized or polymerized form, for example as N-methylated polyethylene imine.

Other suitable catalysts are 1-methyl imidazole, 2-methyl-1-vinyl imidazole, 1-allyl imidazole, 1-phenyl imidazole, 1,2,4,5-tetramethyl imidazole, 1-(3-aminopropyl)-imidazole, pyrimidazole, 4-dimethyl amino-pyridine, 4-pyrrolidinopyridine, 4-morpholinopyridine, 4-methylpyridine and N-dodecyl-2-methyl imidazole or mixtures of two or more thereof.

Besides or instead of the tertiary amines, organometallic compounds, such as organotin compounds of carboxylic acids, strong bases, such as alkali metal hydroxides, alcoholates and phenolates, for example di-n-octyl tin mercaptide, dibutyl tin maleate, diacetate, dilaurate, dichloride, bis-dodecyl mercaptide, tin(II)acetate, ethyl hexoate and diethyl hexoate or lead phenyl ethyl dithiocarbamate, may be present in a one-pack PUR adhesive according to the invention.

In a preferred embodiment of the present invention, a one-pack PUR adhesive according to the invention contains 2,2'-dimorpholinodiethylether, 2-(2-dimethylaminoethoxy)-ethanol, 2-dimethylaminoethyl-3-dimethyl-aminopropy-lether, bis-(2-dimethylaminoethyl)-ether, N,N-dimethyl-piperazine, N-(2-hydroxyethoxyethyl)-2-azanorbornane, Tacat DP-914 (Texaco Chemical), Jefftcat®, N,N,N,N-tetramethylbutane-1,3-diamine, N,N,N,N-tetramethylpropane-1,3-diamine or N,N,N,N-tetramethylhexane-1.6-diamine or mixtures of two or more thereof, more particularly dimorpholinodiethylether, as catalyst.

Besides one or more polyisocyanate prepolymers and preferably one or more catalysts, a one-pack PUR adhesive according to the invention must also contain at least one aminopolyether polyol containing 2 to 4, preferably 3, OH groups where the molar ratio of ether groups to aminonitrogen atoms is ca. 7 to ca. 30, more particularly ca. 9 to ca. 25 or ca. 11 to ca. 20. The reactivity of the aminopolyether polyols can be more or less completely reduced by reaction of the OH groups, for example by esterification or etherification. However, aminopolyether polyols are preferably used.

The term "contain" in relation to the aminopolyether polyol may be interpreted to mean that the aminopolyether polyol or a mixture of two or more suitable aminopolyether polyols is bound into the polymer chain of the polyisocyanate prepolymer.

In a preferred embodiment of the present invention, aminopolyether polyols containing only one aminonitrogen per molecule are used as a constituent of the one-pack PUR adhesives according to the invention.

Accordingly, suitable aminopolyether polyols are, basically, any aminopolyether polyols which may be obtained, for example, by reaction of a tertiary amine containing 3 OH groups with alkylene oxides under suitable conditions, for example under the reaction conditions described above in connection with the production of polyether polyols. In a preferred embodiment of the present invention, aminopolyether polyols obtainable by reaction of trialkanolamines having the general formula N—(—$R^1$—OH)$_3$, in which the substituents $R^1$ independently of one another represent a linear or branched, saturated or unsaturated alkylene group containing 1 to 22 and more particularly 2 to 5 carbon atoms, are used as a constituent of the one-pack PUR adhesive according to the invention.

Aminopolyether polyols based on trialkanolamines having the general formula N(—$R^1$—OH)$_3$, in which the substituents $R^1$ independently of one another represent linear, saturated alkylene groups containing 2 to 4 carbon atoms (ethylene, n-propylene or n-butylene), are particularly suitable. In a preferred embodiment of the present invention, a one-pack PUR adhesive according to the invention contains at least one aminopolyether polyol based on triethanolamine or tripropanolamine.

The aminopolyether polyols suitable for use in accordance with the invention contain ether groups, the overall ratio of ether groups (R—O—R) to aminonitrogen atoms per molecule in an aminopolyether polyol being ca. 7 to ca. 30, more particularly ca. 9 to ca. 25 or ca. 11 to ca. 20 or ca. 11 to ca. 15, for example ca. 12 to ca. 19 or ca. 13 to ca. 18 or ca. 14 to ca. 17 or ca. 15 to ca. 16. The ether groups are produced, for example, by reaction of a trialkanolamine with cyclic ethers. Cyclic ethers containing 2 to ca. 6 carbon atoms, more particularly alkylene oxides containing 2 to ca. 4 carbon atoms, for example ethylene oxide or propylene oxide, are preferably used.

An aminopolyether polyol suitable for use in accordance with the invention may contain ether groups emanating from the reaction with only one type of cyclic ether. However, aminopolyether polyols whose ether groups emanate from the reaction with two or more types of cyclic ethers may equally well be used in accordance with the invention. Such a reaction may have been carried out alternately, blockwise or statistically.

Aminopolyether polyols obtainable by reaction of a trialkanolamine, more particularly triethanolamine or tripropanolamine, with ethylene oxide or propylene oxide or a mixture thereof are particularly preferred for the purposes of the invention.

It has proved to be of advantage for the adhesives according to the invention if the content of alkali metal ions is below a certain limit, for example below ca. 20 ppm, preferably below ca. 10 ppm, for example below ca. 5 ppm, based on the polyisocyanate prepolymer or the polyisocyanate prepolymers.

An adhesive according to the invention contains the polyisocyanate prepolymer or the mixture of two or more such polyisocyanate prepolymers in a quantity of ca. 80 to ca. 99.7% by weight, more particularly in a quantity of ca. 88 to ca. 99.6% by weight, for example in a quantity of ca. 91 to ca. 95% by weight.

The percentage content of catalyst or catalysts in the adhesive according to the invention is in the range from 0 to ca. 8% by weight, for example in the range from ca. 0.2 to ca. 7% by weight.

The percentage content of aminopolyether polyol or aminopolyether polyols in the adhesive according to the invention is between ca. 0.2 and ca. 4% by weight and more particularly between ca. 0.5 and ca. 2% by weight.

The ratio of the catalyst advantageously used to the aminopolyether polyol is, for example, ca. 20:1 to ca. 1:10, for example ca. 20:1 to ca. 1:3 or ca. 10:1 to ca. 1.6:1.

In addition, the adhesive according to the invention may contain typical additives such as, for example, fillers, such as chalk, mineral silicates, for example layer silicates, plastics, hollow beads, silicas, fibrous fillers, pigments, defoamers, coupling agents, plasticizers, antiagers and $CO_2$-absorbing or adsorbing additives, for example molecular sieves and silica gel. However, substances which react chemically with the $CO_2$, for example CaO, may also be added.

The adhesive according to the invention has a viscosity at the application temperature of ca. 500 to ca. 100,000 mPas, for example ca. 1,000 to ca. 20,000 mPas or ca. 2,000 to ca. 10,000 mPas (as measured to EN ISO 2555 using a Brookfield RVTDV-II Digital Viscometer, spindle 2, 20 r.p.m.). Its viscosity changes only negligibly in storage, i.e. the adhesive is still usable. In concrete terms, the viscosity of the adhesive changes by at most +250%, more particularly by at most +100%, based on the starting viscosity, after storage for 3 months at 40° C. in the absence of moisture. As stated above, the viscosity is measured with a Brookfield viscosimeter.

The adhesive according to the invention contains NCO groups in such quantities that significant setting occurs after application of the adhesive to a substrate. The NCO content should preferably be in the range from ca. 1 to ca. 20 g NCO per 100 g adhesive and, more particularly, is in the range from ca. 5 to ca. 19 or ca. 3 to ca. 15 or ca. 8 to ca. 13, for example in the range from ca. 10 to ca. 12 g/100 g adhesive (% by weight). The NCO content is determined to DIN EN 1242 (corresponds to BS EN 1242).

The polyisocyanate prepolymer present in an adhesive according to the invention may be prepared both by a single-stage process and in a multistage process under the typical process conditions known to the expert for the production of NCO prepolymers.

In the preferred single-stage process, for example, all the starting materials are first mixed, optionally in the presence of an organic solvent and preferably under inert conditions, for example in an inert gas atmosphere, at a water content of less than ca. 0.5% by weight and preferably less than ca. 0.1% by weight. The mixture is heated for ca. 0.1 to ca. 3 hours and more particularly for ca. 0.5 to ca. 2 hours to a temperature of ca. 40 to ca. 110° C. and more particularly to a temperature of ca. 60 to ca. 98° C. The reaction time for the production of the polyisocyanate prepolymer or the adhesive as a whole can be shortened by addition of catalysts. Suitable catalysts are, for example, the above-mentioned tertiary amines or organometallic catalysts. Examples of such catalysts are triethyl amine, dimethyl benzyl amine, bis-dimethylaminoethyl ether and bis-methylaminomethyl phenol. Catalysts particularly suitable for the preparation of the polyisocyanate prepolymer are, for example, 1-methyl imidazole, 1-methyl-1-vinyl imidazole, 1-allyl imidazole, 1-phenyl imidazole, 1,2,4,5-tetramethyl imidazole, 1-(3-aminopropyl)-imidazole, pyrimidazole, 4-dimethylaminopyridine (DMAP), 4-pyrrolidinopyridine, 4-morpholinopyridine and 4-methylpyridine or organometallic compounds, such as iron, titanium or tin compounds, more particularly the 1,3-dicarbonyl compounds of iron or 2- or 4-valent tin, more particularly Sn(II) carboxylates or dialkyl Sn(IV) dicarboxylates or the corresponding dialkoxylates, for example dibutyl tin dilaurate, dibutyl tin diacetate, dioctyl tin diacetate, dibutyl tin maleate, tin(II) octoate, tin(II) phenolate or the acetyl acetonates of 2- or 4-valent tin.

In principle, the individual components may be added in any order. For example, polyisocyanates may be added to the aminopolyether polyol separately from the polymer polyols and other polyols, if any, although the polymer polyols and other polyols, if any, may also be directly added before the reaction with the isocyanates. The aminopolyether polyol or the mixture of two or more thereof may be added to the polyisocyanate prepolymer after its preparation.

The adhesive according to the invention has the following advantages for example:
1. It cures very quickly when applied thinly; when applied to wood for example, it cures in ca. 0.5 to less than 5 minutes at room temperature (20° C.).
2. Despite its rapid curing, the adhesive is sufficiently stable in storage, i.e. it changes viscosity by preferably up to at most +100% and, more particularly, by at most up to +50% when stored for 3 months at 40° C. in the absence of moisture. The same also applies where aromatic polyisocyanates are used.
3. The physical properties of the adhesive are barely affected by the addition of the aminopolyether polyol. This applies in particular to its rheology.
4. The adhesive can be universally used because it adheres to many substrates.
5. The adhesive has a long open time and shows high resistance to heat and water.
6. The setting time is shortened, based on the open time. Thus, the ratio of the pressing time to the open time is essentially below 4.0 and not ca. 5.0.
7. The strengths are not changed by the incorporation of the tertiary aminopolyether polyols.

Where a non-incorporated catalyst is additionally used, the setting time is also absolutely reduced, for example to less than 5 or even less than 3 minutes.

The above-mentioned advantages open up potential applications for the one-pack PUR adhesive according to the invention as an adhesive, more particularly as a wood adhesive, as a coating composition or sealant, more particularly as a multipurpose adhesive (household adhesive), assembly adhesive, structural adhesive, paper and packaging adhesive, film laminating adhesive or hotmelt adhesive.

The invention is illustrated by the following Examples.

EXAMPLES

1. Production of a Comparison Polyisocyanate Prepolymer

In an evacuable, heatable and coolable PC laboratory dissolver, 46.95 parts by weight of Lupranol 1000 (polypropylene glycol, BASF), OH value 56, molecular weight 2,000, were dewatered while stirring to a water content of less than 400 ppm at 70° C./15 mbar. After cooling of the dewatered polyol to 30° C., 23 parts by weight Desmodur 44 M (4,4'-diphenylmethane diisocyanate, NCO content 33%, Bayer AG) and 23 parts by weight Desmodur VKS 20 F (4,4'-diphenylmethane diisocyanate with polymer components, NCO content 30.5%, Bayer AG) were added. The reaction mixture obtained was heated with stirring to 60° C. in an inert gas atmosphere and 0.05 part dibutyl tin dilaurate were added. During the prepolymer-forming reaction, the temperature in the reaction mixture rose to ca. 95° C. The reaction mixture was then stirred at ca. 85° C. until the theoretical NCO value expected had been reached to within a margin of ca. 0.5%. The prepolymer obtained was then cooled with stirring to room temperature.

2. Determining a Suitable Catalyst Content for a Comparison Adhesive

Various quantities of catalyst were added to the comparison prepolymer obtained as described in 1. and, after homogenization, the open time, the pressing time and stability in storage were determined. The quantities of catalyst used and the results obtained are set out in Table 1 below (quantities in parts by weight, times in minutes).

TABLE 1

| Formulation | A1 | B1 | C1 | D1 | E1 |
|---|---|---|---|---|---|
| Prepolymer | 93 | 93 | 93 | 93 | 93 |
| DMDEE[1] | 0.5 | 1 | 2 | 6 | 8 |
| Open time | 7 | 4 | 2.5 | 1 | 0.95 |
| Pressing time | 35 | 15 | 10 | 5.1 | 5.0 |
| Stability in storage | + | + | + | + | − |

[1]dimorpholino-2,2'-diethylether (manufacturer: Air Products)

The Examples show that, in the present case intended for comparison, reactivity reaches the start of a plateau at a quantity of ca. 6 parts by weight DMDEE and can only be negligibly increased by addition of more catalyst. In addition, any further increase in the quantity of catalyst beyond the start of the plateau leads to a reduction in storage stability (see formulation E1).

3. Production of an Adhesive According to the Invention

The procedure was as described in Example 1 except that, in addition to Lupranol 1000 (polypropylene glycol, BASF), OH value 56, molecular weight 2,000, an aminopolyether polyol based on triethanolamine and 17 mol EO (OH value 150) was added in the quantities shown in Table 2 below.

4. Testing of the Open Time and Pressing Time of the Adhesive Where the Aminopolyether Polyols According to the Invention are Added.

Formulations A2 to F2 of Table 2 below were prepared and tested for open time, pressing time and storage stability. The results are set out in Table 2.

TABLE 2

| Formulation | A2 | B2 | C2 | D2 | E2 | F2 |
|---|---|---|---|---|---|---|
| Prepolymer | 99 | 99 | 99 | 97 | 95 | 94 |
| Aminopolyether polyol content | 6 | 6 | 6 | 4 | 2 | 1 |
| DMDEE | — | 1 | 6 | 6 | 6 | 6 |
| Open time | 8 | 3.5 | 0.9 | 0.92 | 0.97 | 1 |
| Pressing time | 20 | 12 | 4.9 | 3.8 | 3.0 | 2.5 |
| Stability in storage | + | + | − | − | + | + |

The properties of formulations F2 and D1 are compared in Table 3 below.

TABLE 3

| | Example | |
|---|---|---|
| Test | F2 (invention) | D1 |
| Open time | 1 minute | 1 minute |
| Pressing time | 2.5 minutes | 5.1 minutes |
| Viscosity | 4,750 mPas | 5,000 mPas |
| Watt 91 | 8.4 N/mm$^2$ | 8.4 N/mm$^2$ |
| EN 204 D1 | 14.2 N/mm$^2$ | 13.9 N/mm$^2$ |
| EN 204 D2 | 12.3 N/mm$^2$ | 12.0 N/mm$^2$ |
| EN 204 D3 | 5.7 N/mm$^2$ | 5.5 N/mm$^2$ |
| EN 204 D4 | 5.2 N/mm$^2$ | 5.2 N/mm$^2$ |
| Stability in storage | + | + |

The comparison shows that the composition according to the invention requires a distinctly reduced pressing time for exactly the same open time. The strengths are virtually the same.

Required values and storage sequence after which the EN 204 D1-D4 values were determined.

| EN 204 D1 | Required >= 10 N/mm$^2$ | Dry bond strength | Storage sequence 1 |
|---|---|---|---|
| EN 204 D2 | Required >= 8 N/mm$^2$ | Wet bond strength | Storage sequence 2 |
| EN 204 D3 | Required >= 4 N/mm$^2$ | Wet bond strength | Storage sequence 3 |
| EN 204 D4 | Required >= 4 N/mm$^2$ | Wet bond strength | Storage sequence 5 |

Testing was carried out using an electronic tensile tester (Instron Model 4302, 10 kN).

5. Description of the Test Methods

Water content: Karl Fischer, results in ppm.

NCO content: NCO content determined to DIN EN 1242

Viscosity: Brookfield RTVDV II Digital Viscometer at 23° C., results in mPas.

Determination of Open Time:

The measurement was carried out on conditioned, unsteamed solid beech (*Fagus sylvatica*, 400×125×5 mm) with a wood moisture of 8 to 10% and an adhesive coating of 200 μm. The measurement was conducted under constant climatic conditions at 23° C./50% relative air humidity. The adhesive to be tested, which had been stored at 23° C., was applied with a spiral coating knife. The time it took for a skin to form on the adhesive was recorded.

Determination of Pressing Time:

The test specimens of unsteamed solid beech (*Fagus sylvatica*, 125×20×5 mm) were stored for one month under constant climatic conditions (23° C., 50% relative air humidity) to establish an identical balancing wood moisture (ca. 8%). Using a spiral coating knife, one side of the test specimens to be bonded was coated with a 200 μm adhesive layer, immediately joined to the second test specimen and subjected to a pressure of 0.35 N/mm$^2$. The test was repeated with increasing pressing times until a minimum strength of 3 N/mm$^2$ was achieved in the tensile test. The rate of advance of the tensile tester was 50 mm/min. The pressing time required to achieve a strength value of 3 N/mm$^2$ was recorded.

Determination of Heat Resistance to Watt 91:

Test specimens to DIN EN 205 were prepared using the adhesive to be tested. The test specimens were then tensile-shear tested to DIN EN 204 D1, storage sequence 1, but after heating rather than at room temperature. To this end, the test specimens were stored for 1 h at 80° C. in a recirculating air drying cabinet and were tensile-tested in an Instron electronic tensile tester 10 seconds after removal from the drying cabinet. The rate of advantage of the tensile tester was 50 mm/min. Results as force in N/mm$^2$.

Determination of Water Resistance:

DIN EN 204 of October 1991. Results as force in N/mm$^2$.

Testing of Storage Stability:

The adhesive to be tested was stored for 3 months at 40±1° C. in a 250 ml glass bottle with a water-vapor-impermeable closure. After storage, the viscosity of the adhesive was measured. Storage stability is good (+) if the final viscosity after the storage period is higher by a factor of 2.5 or less than the viscosity at the beginning of storage.

What is claimed is:

1. A one-pack polyurethane adhesive comprising a polyisocyanate prepolymer and at least one aminopolyether polyol, having a molar ratio of ether groups to amino nitrogen in the aminopolyether polyol of 7 to 30, and comprising one or more non-incorporable catalysts in a weight ratio of said catalysts to the at least one aminopolyether polyol of 20:1 to 1:3.

2. The adhesive of claim 1, having a content of alkali metal ions of less than 20 ppm.

3. The adhesive of claim 1, comprising at least 88% by weight polyisocyanate prepolymers.

4. The adhesive of claim 1, wherein the polyisocyanate prepolymer has an NCO content of 4 to 17% by weight.

5. The adhesive of claim 1 having a content of aminopolyether polyol or aminopolyether polyols of 0.2 to 4% by weight.

6. The adhesive of claim 1, comprising an aminopolyether polyol based on triethanolamine or tripropanolamine.

7. The adhesive of claim 1, wherein the non-incorporable catalyst comprises 2,2'-dimorpholinodiethylether.

* * * * *